May 20, 1958 A. G. SCHILBERG 2,835,506
X-MEMBER FRAME

Filed April 26, 1956 2 Sheets-Sheet 1

INVENTOR.
ARNOLD G. SCHILBERG
BY
Andrus & Scales

Attorneys

May 20, 1958   A. G. SCHILBERG   2,835,506
X-MEMBER FRAME
Filed April 26, 1956   2 Sheets-Sheet 2
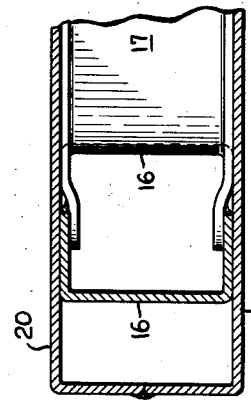
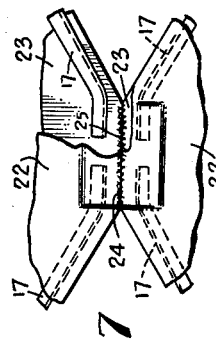
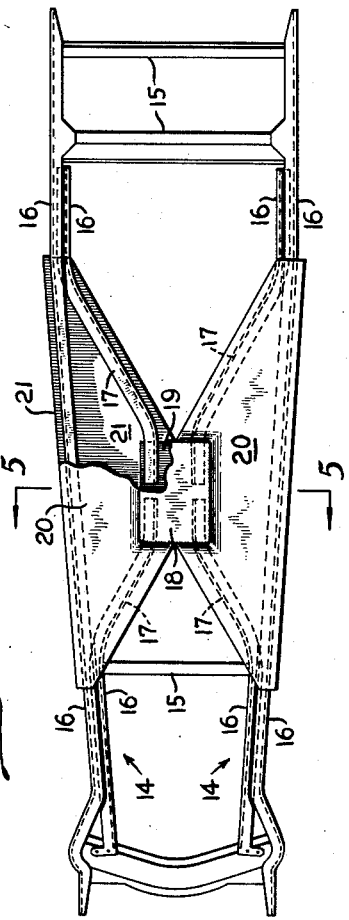
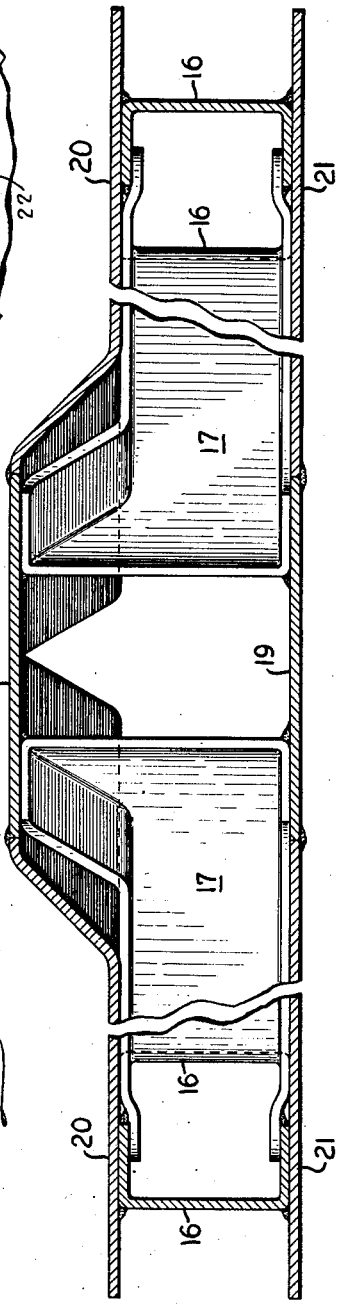
INVENTOR.
ARNOLD G. SCHILBERG
BY
Andrus & Scales
Attorneys

United States Patent Office 2,835,506
Patented May 20, 1958

2,835,506

X-MEMBER FRAME

Arnold G. Schilberg, Milwaukee, Wis., assignor to A. O. Smith Corporation, Milwaukee, Wis., a corporation of New York Application April 26, 1956, Serial No. 580,886

10 Claims. (Cl. 280—106)

This invention relates to X-member frames and more particularly to an X-member vehicle frame having a large box-like structure for use with convertibles, sport cars and the like.

In the manufacture of convertibles and small cars such as sport cars, the automobile industry has been faced with the problem of producing extremely rigid frames at a reasonable cost. It is important that these frames have high rigidity in order to adequately support a somewhat flimsy body structure and prevent excessive shaking and rattling. One of the biggest problems has been to prevent side-shake of the vehicle body, and also possible match-boxing or parallelogramming of the frame.

The present invention solves the aforementioned problems and provides an X-member frame having large horizontal plates secured thereto to form a gigantic closed box which is more rigid than conventional X-member structures and yet is comparatively low in fabrication cost.

The accompanying drawings illustrate the best mode presently contemplated by the inventor for carrying out the invention.

In the drawings:

Fig. 4 is a top plan view of a vehicle frame showing another embodiment of the invention, with parts broken away;

Fig. 5 is a transverse section taken on line 5—5 of Fig. 4;

Fig. 6 is a fragmentary transverse section of a frame similar to that shown in Figs. 4 and 5, and showing the plates with joined flanges; and Fig. 7 is a fragmentary top plan view with parts broken away of the central portion of a vehicle frame constructed in accordance with the invention, and showing a structure in which the tie plates are eliminated.

Figure 1:
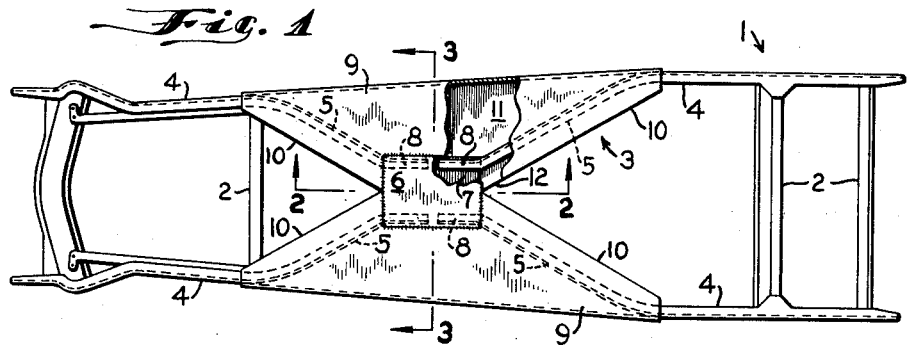
Figure 1 is a top plan view of a vehicle frame constructed in accordance with the invention and with parts broken away.
Figure 2:
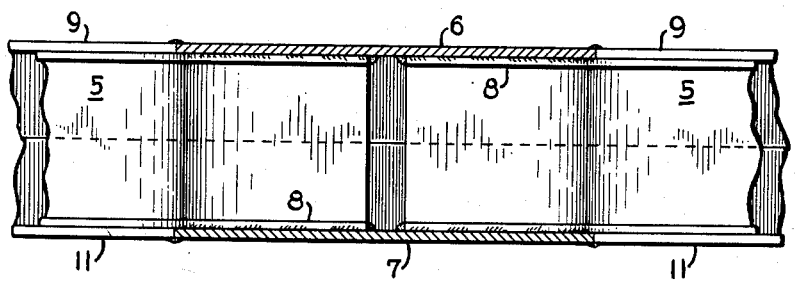
Fig. 2 is a longitudinal section taken on line 2—2 of Figure 1.
Figure 3:
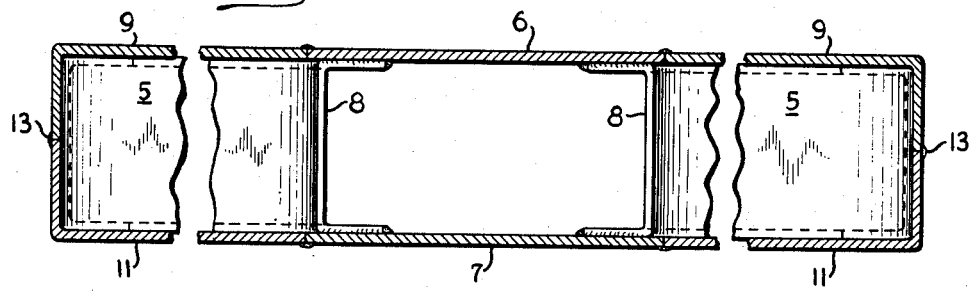
Fig. 3 is a transverse section taken on line 3—3 of Figure 1.

As shown in Figs. 1–3 of the drawings, the invention is embodied in a frame 1 adapted for use in a sport car or other similar vehicle. Frame 1 comprises, generally, a pair of longitudinally extending spaced side rail portions which are suitably joined by transversely extending cross-members 2. An X-member 3 is disposed centrally of frame 1 and is intimately joined to the side rail portions in a manner to be described.

Each side rail comprises a pair of channel-section arms 4 which are secured adjacent their outer ends to cross members 2 and extend longitudinally inwardly toward each other and in the same longitudinal plane. Approximately midway of their length, arms 4 are bent or formed so that their inner portions extend diagonally inwardly toward the center of the frame to form front and rear leg portions 5 of the X-member.

The four legs 5 converge to the center of frame 1 and are joined together by upper and lower spaced horizontal tie plates 6 and 7, respectively, which are suitably welded to the inwardly extending flanges 8 of the legs. Tie plates 6 and 7 are shown as rectangular in shape and cover only a small inner end portion of legs 5 which are bent to the longitudinal at the center structure of the frame.

X-member fabrication costs are substantially lessened by the above described construction, since a side rail arm 4 and X-member leg 5 may be made from a single channel member which is formed to a suitable horizontal contour.

To fill the gap between each front and rear side rail member, and to provide high torsional rigidity in the frame, a substantially triangular plate 9 is disposed above each corresponding pair of front and rear legs 5 and extends therebetween. Each plate 9 has a pair of diagonally inwardly extending edges 10 which are contoured with and essentially coextensive with legs 5. The flanges 8 of legs 5 are welded to plates 9 adjacent edges 10. The outer longitudinal portion of each upper plate 9 is welded at its ends to the front and rear arms 4 longitudinally outwardly from the diagonal bend, the longitudinal edge extending to fill the gap between arms 4.

Each plate 9 is of approximately the same thickness as the tie plate and is cut away adjacent the intersection of edges 10 to receive plate 6, the intersection of edges 10 with plate 6 being approximately midway along the transverse edges of plate 6. The two plates 9 are seam welded to tie plate 6 and actually become extensions thereof.

Triangular members 11 are secured to the lower tie plate 7 and the lower flanges of arms 4 and legs 5 in a manner similar to that described with respect to plates 9. The diagonal edges 12 of members 11 correspond to edges 10 of plates 9. Plates 9 and 11 are of approximately the same size and shape, and in plan view their contours coincide.

To close the space between arms 4, the corresponding longitudinal edge portions of each pair of upper and lower plates are made to extend outwardly beyond the frame and are flanged inwardly toward each other so that they meet. A weld 13 joins the edges so disposed, as best seen in Fig. 3.

Although, in the construction described above, the outer side rail portion and X-members are of channel section, the addition of plates 9 and 11 thereto converts legs 5 into I-beams having high vertical rigidity. By bending the longitudinal edge portions of plates 9 and 11 so that they are joined, the longitudinal gap between the front and rear arms 4 is actually filled by a side rail portion comprising a channel member having large horizontal flanges which extend inwardly to the center of the frame.

Figs. 4 and 5 show a modified form of the invention. As there is shown, the frame has a pair of side rails, indicated generally at 14, the side rails being joined intermediate and adjacent their ends by suitable cross members 15. Each side rail comprises a pair of channel members 16 which are overlapped with facing flanges and secured together adjacent the end portions of the frame to form a closed box section. The outer channel 16 of each side rail extends the entire length of the frame. Each inner channel 16 extends longitudinally from the end of the frame and about one-fourth of the frame's length, at which point each inner channel is bent inwardly and diagonally toward the frame center, forming one leg 17 of an X-member. The four legs 17 converge toward the center and are tied together by upper and lower tie plates 18 and 19, respectively, in a manner similar to the center construction of Figs. 1–3. The portion of each side rail between the diagonal bends of inner channels 16 becomes a single channel member with inwardly facing flanges. The webs of legs 16 are shown as heightened adjacent the central structure to more readily allow passage of the drive shaft, not shown.

In all makes of cars, the trend is toward lower floors. This is accomplished in part by making the side rails more shallow and of thinner stock. The reduction of torsional rigidity due to these changes has produced major problems in the automotive industry.

Applicant puts back the rigidity which has been lost by adding large triangular plates to the frame shown in Figs. 4 and 5. Upper plates 20 and lower plates 21 are disposed similarly to plates 9 and 11, and are secured to the frame in a similar manner.

However, in this second embodiment, the frame does have central longitudinal side rail sections of its own. Plates 20 and 21 are disposed over these portions of the side rails and overlap them in an outboard direction, creating in essence an I-beam side-rail portion with large inwardly extending flanges. Although Figs. 4 and 5 of the drawings show the longitudinally extending edge portions of plates 20 and 21 as being horizontal and welded to the outer channels 16, these portions may be flanged inwardly and secured together in a manner similar to the first embodiment, forming box sections with the outer channels 16 which increase the vertical and torsional rigidity of the central portion of the side rails. This is shown in Fig. 6.

Plates 20 and 21 are also contoured with and secured adjacent their diagonal edges to the flanges of legs 17, and overlap the legs in an inboard direction. Here the plates would again serve to convert the legs into I-beams, increasing their bend rigidity and stability to act like beams.

If desired, the tie plates may be eliminated and the triangular plates extended farther inwardly and welded together in abutting relationship. The triangular plates would then also serve as tie members. Such a structure is shown in Fig. 7, in which upper triangular plates 22 and lower triangular plates 23 extend to the center and are joined by longitudinal welds 24 and 25.

The invention provides a novel structure adapted to produce a vehicle frame of high bend and torsional rigidity and stability. The large plates utilized not only produce a gigantic closed box frame, but also function as part of the side rails and X-member portions and convert channel members into I-beams or box sections. These plates also serve as outward extensions of the tie plates, thereby strengthening the center structure substantially.

Various modes of carrying out the invention are contemplated as being within the scope of the following claims which particularly point out and distinctly claim the subject matter which is regarded as the invention.

I claim:

1. A vehicle frame, comprising spaced generally parallel side rail members joined by transversely extending front and rear cross members, each side rail member having at least one front or rear leg portion formed diagonally inwardly toward the center of the frame, the leg portions converging to the center to form an X-member with the leg portions being rigidly secured at their inner ends, a pair of large triangular generally horizontal plates with each plate being joined to and disposed between the upper portions of a pair of front and rear legs and the side rail adjacent thereto, the diagonal edges of said plates being substantially co-extensive with said legs to bridge the gap therebetween, and a second pair of triangular generally horizontal plates with each plate being joined to and disposed between the lower portions of a pair of front and rear legs and the side rail adjacent thereto, the diagonal edges of said second named plates being substantially coextensive with said legs to bridge the gap therebetween, said first and second named plates overlapping said side rails in an outward direction and with their longitudinal edges being flanged inwardly toward each other and joined together, said frame having high rigidity.

2. A vehicle frame, comprising a plurality of longitudinally extending spaced front and rear side rail members joined together adjacent their outer ends by transverse cross members, said side rail members being bent adjacent their mid-portions and extending diagonally inwardly toward the center of the frame to form legs of an X-member, said legs being rigidly secured at their inner ends to upper and lower tie members which form the center structure of the X-member, a pair of generally triangular upper plates with the diagonal edges of each plate being substantially coextensive with a pair of front and rear legs and secured to the upper surfaces thereof and with the longitudinal edge of each plate bridging the gap between a corresponding pair of front and rear side rail members, said upper plates being joined at the center of the frame to said upper tie member, a pair of generally triangular lower plates with the diagonal edges of each plate being substantially coextensive with a pair of front and rear legs and secured to the lower surfaces thereof and with the longitudinal edge of each plate bridging the gap between a corresponding pair of front and rear side rail members, said lower plates being joined at the center of the frame to said lower tie member, and said upper and lower plates forming a large box having high rigidity.

3. The frame of claim 2 in which the longitudinal edges of a corresponding pair of upper and lower plates are flanged inwardly toward each other and joined together to form an extension of the side rail members midway of the length of said frame.

4. A vehicle frame, comprising a plurality of longitudinally extending spaced front and rear side rail members joined together adjacent their outer ends by transverse cross members, said side rail members being of channel section with their flanges facing inwardly, the side rail members being bent adjacent their mid-portions and extending diagonally inwardly toward the center of the frame to form legs of an X-member with the legs being rigidly secured at their inner ends to upper and lower tie members to form the center structure of the X-member, a pair of generally triangular upper plates with the diagonal edge portions of each plate being substantially coextensive with and secured to the upper flanges of a pair of front and rear legs, and a pair of generally triangular lower plates with the diagonal edge portions of each plate being substantially coextensive with and secured to the lower flanges of a pair of front and rear legs, the diagonal edges of said upper and lower plates extending inboardly from their respective legs to form I-beams having high vertical rigidity and having flanges which extend a substantial distance in an outboard direction, the longitudinal edge portions of each plate bridging the gap between a corresponding pair of front and rear side rail members, and with the longitudinal edges of each corresponding pair of upper and lower plates being flanged inwardly toward each other and joined together to form an extension of the side rail members midway of the length of said frame.

5. In a vehicle frame having a plurality of longitudinal side rail members joined adjacent their ends by transverse cross members and having a plurality of diagonal legs which extend inwardly from the side rails and converge to and terminate adjacent the center of the frame to form an X-member, structure comprising a pair of generally triangular horizontal upper plates with the diagonal edge portions of each plate being substantially coextensive with and secured to the upper surfaces of a pair of front and rear legs, and a pair of generally triangular horizontal lower plates with the diagonal edge portions of each plate being substantially coextensive with and secured to the lower surfaces of a pair of front and rear legs, at least a portion adjacent the longitudinal edge of each plate being secured to a side rail member, said pairs of plates being joined together adjacent the center of the frame and secured to the inner ends of said legs, and said plates together with said side rail members and said legs forming a large box having high rigidity during operation of the vehicle.

6. A vehicle frame, comprising a plurality of longitudinally extending spaced side rail members joined together adjacent their outer ends by transverse cross members, each of said side rail members comprising adjacent each end an inner and outer channel member with the channel members having overlapping horizontal flanges secured together to form a side rail of box section, the outer channel member extending substantially the entire length of the frame, each inner channel member being bent diagonally inwardly to form a leg of an X-member with the legs converging toward the center of the frame and being rigidly secured at their inner ends, a pair of generally triangular upper plates with the diagonal edges of each plate being substantially coextensive with and secured to the upper flanges of a pair of front and rear legs and with the longitudinal edge portion of each plate being disposed in engagement with the upper flanges of said outer channel member, and a pair of generally triangular lower plates with the diagonal edges of each plate being substantially coextensive with and secured to the lower flanges of a pair of front and rear legs and with the longitudinal edge portion of each plate being disposed in engagement with the lower flanges of said outer channel member, said upper and lower plates forming a large box having high rigidity.

7. The structure of claim 6 in which the longitudinal edge portions of the plates extend beyond said outer channel members in an outboard direction and are flanged inwardly so that the longitudinal edges of a corresponding pair of upper and lower plates are joined together to form a box with said outer channel member adjacent the mid-portion of the side rail.

8. In a vehicle frame having a plurality of longitudinal side rail members joined adjacent their ends by transverse cross members and having a plurality of diagonal legs which extend inwardly from the side rails and converge to the center of the frame to form an X-member, structure comprising a pair of generally triangular horizontal upper plates with the diagonal edge portions of each plate being substantially coextensive with and secured to the upper surfaces of a pair of front and rear legs, and a pair of generally triangular horizontal lower plates with the diagonal edge portions of each plate being substantially coextensive with and secured to the lower surfaces of a pair of front and rear legs, at least a portion adjacent the longitudinal edge of each plate being secured to a side rail member, the longitudinal edge portions of a corresponding pair of upper and lower plates being flanged inwardly so that the edges are joined to increase the rigidity of the side rails.

9. A vehicle frame, comprising a plurality of longitudinally extending spaced front and rear side rail members joined together adjacent their outer ends by transverse cross members, said side rail members being bent adjacent their mid-portions and extending diagonally inwardly toward the center of the frame to form legs of an X-member, a pair of generally triangular upper plates with the diagonal edges of each plate being substantially coextensive with a pair of front and rear legs and secured to the upper surfaces thereof and with the longitudinal edge of each plate bridging the gap between a corresponding pair of front and rear side rail members, a pair of generally triangular lower plates with the diagonal edges of each plate being substantially coextensive with a pair of front and rear legs and secured to the lower surfaces thereof, and with the longitudinal edge of each plate bridging the gap between a corresponding pair of front and rear side rail members, said pairs of plates being joined together adjacent the center of the frame and secured to the inner ends of said legs, and said upper and lower plates forming a large box having high rigidity.

10. In a vehicle frame having spaced generally parallel side rail members joined adjacent their corresponding outer ends by transverse cross members and having a plurality of diagonal legs extending inwardly from the side rails and converging toward the center of the frame to form an X-member, structure comprising a pair of generally triangular horizontal upper plates with the diagonal edge portions of each plate substantially coextensive with the upper surfaces of a pair of front and rear diagonal legs and secured to said legs, a pair of generally triangular horizontal lower plates with the diagonal edge portions of each plate substantially coextensive with the lower surfaces of a pair of front and rear diagonal legs and secured to said legs, at least a portion adjacent the longitudinal edge of each plate being secured to a corresponding side rail member, and means at the center of said X-member to secure said plates and diagonal legs integrally together to provide a rigid structure.

References Cited in the file of this patent

UNITED STATES PATENTS 2,646,991     Weaving  --------------- July 28, 1953